United States Patent [19]

Gerber

[11] Patent Number: 4,473,405

[45] Date of Patent: Sep. 25, 1984

[54] ADMIXTURE FOR HYDRAULIC CEMENT

[75] Inventor: Arthur H. Gerber, Beachwood, Ohio

[73] Assignee: Martin Marietta Corporation, Bethesda, Md.

[21] Appl. No.: 484,062

[22] Filed: Apr. 11, 1983

[51] Int. Cl.³ .................................................. C04B 7/35
[52] U.S. Cl. ...................................... 106/90; 106/315
[58] Field of Search ................................... 106/90, 315

[56] References Cited

U.S. PATENT DOCUMENTS

| | | | |
|---|---|---|---|
| 3,782,991 | 1/1974 | Burge | 106/315 |
| 4,256,500 | 3/1981 | Turpin | 106/88 |
| 4,298,392 | 11/1981 | Isselmann | 106/98 |
| 4,337,094 | 6/1982 | Tokar | 106/90 |
| 4,373,956 | 2/1983 | Rosskopf | 106/90 |

Primary Examiner—James Poer
Attorney, Agent, or Firm—Bruce M. Winchell; Gay Chin

[57] ABSTRACT

The present invention is a specific combination of components having unique properties both in composition and benefits. Such a combination has been found in alkali or alkaline earth metal nitrates, alkanolamines and alkali or alkaline earth metal thiocyanates. In such combinations it has also been found that alkaline and alkali earth thiosulfates and chlorides below the concentration level where corrosion is promoted may advantageously be substituted for all or part of the thiocyanates and that diethanolamine, N,N-di(hydroxyethyl)glycine (bicine) and N,N-di(hydroxyethyl)-β-aminopropionic acid (DAPA) and certain alkanolamines and alkanolamino acids and derivatives may advantageously be substituted for all or part of the triethanolamine.

33 Claims, No Drawings

ADMIXTURE FOR HYDRAULIC CEMENT

BACKGROUND OF THE INVENTION

This invention relates to admixture compositions for incorporation into hydraulic cement mixes, such as concretes, mortars and grouts and dry mixes for making these, to provide economy, compressive strength benefits at all ages, and a desirable degree of acceleration of rate of hardening and setting.

The use of chemical admixtures to achieve these effects is well known in the art. For example, calcium chloride is well known as an economic and effective accelerator, but has the disadvantage of promoting corrosion of metal embedments at certain dosages, as well as other disadvantages. Thus, there is a need for economical and effective agents to replace calcium chloride in this application, and this has promoted a continuing search on the part of the industries involved.

Thus, U.S. Pat. No. 3,782,991 issued to Burge discloses anhydrous aluminum sulfate to increase early compressive strength of building materials, together with triethanolamine as a set accelerator.

Also, U.S. Pat. No. 4,298,392 issued to Isselmann discloses an admixture comprised of a combination of silica sol and sodium thiocyanate employed to increase compressive strength of cementitious systems prior to 72 hours. However, his data show that the desired effect is not achieved by the thiocyanate alone, but only by the combination.

In addition, U.S. Pat. No. 4,256,500 issued to Turpin discloses a variety of inorganic compounds for use in cementitious systems containing pozzolanic materials in order to obtain cement compositions more economical than compositions of equivalent compressive strength that previously have been employed. The chemical agents employed alone or in combination include alkali thiosulfate, sulfate, sulfite, nitrate, nitrite, thiocyanate, cyanide, chlorides and others. Superior effects were secured by combinations of sodium thiocyanate and sodium thiosulfate as shown in Turpin's Table 12, but even more complex mixtures yielded good results as shown in his Table 13 for sodium nitrate plus sodium thiosulfate, plus sodium sulfite plus sodium sulfate.

There is also U.S. Pat. No. 4,337,094 issued to Tokar disclosing as an accelerator for cementitious systems and also to improve compressive strength, a combination of calcium nitrate in the range of 0.5 to 3.0% based on weight of cement and an alkanolamine, with or without minor amounts of gluconates or lignosulfonates.

U.S. Pat. No. 4,373,956 issued to Rosskopf discloses an admixture consisting of an alkali or alkaline earth or ammonium salt of thiocyanic acid in combination with an alkanolamine which when added to a cementitous mix will increase the rate of hardening of the mix and will increase the compressive strength of the mix after hardening.

The art just cited approaches the goal of securing a desired degree of acceleration of rate of set of cementitious systems without sacrifice to either early or ultimate compressive strength, but still greater benefits of this type are desired than are possible with use of the admixtures thus far developed. Therefore, it would be highly advantageous to develop an admixture which would accelerate the rate of hardening and increase compressive strength of the hardened mix to a still greater degree, and to do so in an economical manner.

SUMMARY OF THE INVENTION

The present invention is a specific combination of components having unique properties both in composition and benefits. Such a combination has been found in alkali or alkaline earth metal nitrates, alkanolamines and alkali or alkaline earth metal thiocyanates. In such combinations it has also been found that alkaline and alkali earth thiosulfates and chlorides below the concentration level where corrosion is promoted may advantageously be substituted for all or part of the thiocyanates and that diethanolamine, N,N-di(hydroxyethyl)glycine (bicine) and N,N-di(hydroxyethyl)-$\beta$-aminopropionic acid (DAPA) and certain alkanolamines and alkanolamino acids and derivatives may advantageously be substituted for all or part of the triethanolamine. The latter compounds are illustrative of a class of compounds that may be prepared by an addition reaction between an activated olefin and secondary amines, as follows:

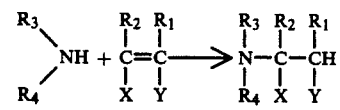

alternatively, such compounds may be prepared as illustrated in the following generalized reaction:

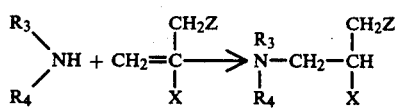

where $R_1$ and $R_2$ are hydrogen or methyl, X is a carboxylic acid and its lower alkyl esters, nitrile, amide and N-substituted amide, Y is H or X, and Z is X, alkali or alkanolamine carboxylate salt and $R_3$ is H, $-CH_2-CH_2-OH$ or

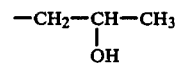

and $R_4$ is $-CH_2-CH_2-OH$ or

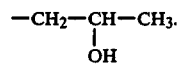

In addition, in the above equations, when $Z=X=CO_2H$ one obtains itaconic acid, which when reacted as the monosodium salt with diethanolamine yields N,N-di(hydroxyethylamino)methyl succinic acid, monosodium salt, which has been found to be highly effective in enhancing compressive strength and in accelerating rate of hardening of cementitious mixes.

Mixtures of these in specific ranges of absolute amounts and relative proportions incorporated into cementitious systems have been found to yield beneficial effects on rate of hardening of cementitious mixes and on early and ultimate compressive strength after hardening, surprising in degree and due to interactive effects not predictable by one skilled in the art.

It is therefore an object of the present invention to provide improved hydraulic cement mixes, such as portland cement mixes, mortars and grouts by incorporation of a specified admixture before, after or during addition of water.

It is another object of this invention to provide improved hydraulic cement mixes, such as portland cement mixes, including concrete, mortar and grout mixes, neat cement mixes, nonplastic cement mixes, and dry mixes, which include an admixture which will advantageously accelerate the rate of hardening and setting of the cement mix and increase the early compressive strength.

The invention comprises a hydraulic cement mix including hydraulic cement, aggregate, sufficient water to effect hydraulic setting of the cement and an additive comprising a mixture of an alkali or alkaline earth or ammonium salt of thiocyanic acid, an alkanolamine and an alkali, alkaline earth or ammonium salt of nitric acid, and corresponding mixtures in which alkali or alkaline earth thiosulfates and chlorides below the level where corrosion is promoted are substituted for some or all of the nitrate and certain alkanolamino acids and their water soluble salts are substituted for the alkanolamine, the additive being present in an amount sufficient to increase the rate of hardening of the mix and the compressive strength of the hardened mix. The admixture is preferably selected from the group comprising sodium, potassium, ammonium, calcium or magnesium thiocyanate in combination with triethanolamine and ammonium, sodium, potassium, calcium or magnesium nitrate and the substitutions just cited and is present in a total amount up to about 3.0% by weight based on the weight of cement, generally in an amount between about 0.10% and 2.0% by weight based on weight of cement and preferably the three components being in the following ranges or weight percent of cement: the nitrate, 0.05% to 2.0%; the alkanolamine, 0.005% to 0.08%; and the thiocyanate, 0.01% to 0.50%. Use of this additive in the preferred ranges of its components results in an acceleration of rate of hardening as well as an increase in compressive strength of the cementitious system.

DESCRIPTION OF THE PREFERRED EMBODIMENTS

For the purposes of this invention the term "hydraulic cement" is intended to include all cementitious compositions capable of hardening by the action of water, but the preferred use is in portland cement mixes, with or without interground or interblended pozzolanic materials.

The salts of the thiocyanic acid have the general formula $$M(SCN)_x$$

where M is an alkali metal or ammonium radical or an alkaline earth metal and where X is 1 for alkali metal salts and 2 for alkaline earth salts. These salts are variously known as sulfocyanates, sulfocyanides, rhodanates or rhodanide salts. Alkanolamine is a generic term for a group of compounds in which trivalent nitrogen is attached directly to a carbon atom of an alkyl alcohol and examples are monoethanoalamine, diethanolamine and triethanolamine. The alkanolamino acids and their derivatives that may be substituted for the alkanolamines are described above.

The thiosulfate salts that may be substituted in part or entirely for the thiocyanates have the general formula $$M_x(S_2O_3)$$

where M is alkali metal or an alkaline earth metal and X is 2 for alkali metal and ammonium salts and 1 for alkaline earth salts.

The salts of nitric acid have the general formula $$M(NO_3)_x$$

where X is 1 for alkali metal salts and 2 for alkaline earth salts, and M has the meaning indicated above.

In the practice of the present invention, the three components described above are incorporated into hydraulic cement mixes in amounts sufficient to accelerate the rate of hardening and setting of the mixes and to increase compressive strength after hardening. The admixture is preferably incorporated into the mix as an aqueous solution comprising a portion of the water used in mixing the hydraulic cement, aggregate, and where desired, pozzolanic material. The term includes both fine aggregate such as sand and coarse aggregate such as gravel as is common in the art. The proportion of fine and coarse aggregate will vary depending on the desired properties of the mortar or concrete. The amount of water generally should be enough to effect hydraulic setting of the cement component and to provide a desired degree of workability to the mix before hardening.

For the purpose of illustrating the advantages obtained by the practice of the present invention, plain concrete mixes were prepared and compared with similar mixes containing the admixture described above. The same type and brand of cement was used in each test series and the kinds and proportions of aggregates were held substantially constant. The methods and details of testing were in accordance with current applicable ASTM standards, and in each series of tests the individual mixes were on a comparable basis with respect to cement content and degree of workability as measured in accordance with ASTM C 143-78. The tests were made with all materials at about 70° F. (21° C.), with a sand to coarse aggregate weight ratio of 0.48±0.01 and a cement content in the mix of 420 lbs. per cubic yard (249 kg/m$^3$).

Data in Table I show that modest benefits are secured in terms of acceleration and compressive strength increases at all ages tested wth the particular dosage of calcium nitrate chosen, as was to be expected. Addition of the specified dosage of triethanolamine to the calcium nitrate admixture further increased these benefits. Addition of the third component, the thiocyanate, still further increased these benefits. However, doubling the amounts of the first two components, other things being equal (comparing Mix 5 with Mix 4), while still further increasing most benefits, did so only modestly when one compares total admixture dosages (0.56 for Mix 4 and 1.07 for Mix 5), and actually decreased the early or one-day compressive strength. In summary, the data show a beneficial additivity of the three admixture components, with unexpected benefits at relatively low dosages, which would translate to greater cost-effectiveness. This effect is more clearly shown in Table II, where the same cement, mix design and test conditions were employed, except that 7 day and 28 day compressive strength tests were not made, and sodium nitrate was used in lieu of calcium nitrate. In comparing Mix 7 and Mix 8 one sees that very significant decreases in the nitrate and amine components unexpectedly gave comparable benefits.

TABLE I

| Mix No. | Admixture, Wt percent of cement on solid basis | Time of Set Relative To Plain Mix (Hrs) Initial Set | Time of Set Relative To Plain Mix (Hrs) Final Set | Compressive Strength, psi (MPa) 1-day | Compressive Strength, psi (MPa) 7-days | Compressive Strength, psi (MPa) 28-days |
|---|---|---|---|---|---|---|
| 1. | None | 6¾ | 9⅞ | 540 (3.7) | 2169 (15.0) | 3404 (23.5) |
| 2. | Ca(NO₃)₂, 0.50 | 6¼ | 8¼ | 548 (3.8) | 2335 (16.1) | 3549 (24.5) |
| 3. | Ca(NO₃)₂, 0.50 + triethanolamine, 0.01 | 5⅞ | 7½ | 583 (4.0) | 2470 (17.0) | 3941 (27.2) |
| 4. | Ca(NO₃)₂, 0.50 + triethanolamine, 0.01 + NaCNS, 0.05 | 5⅛ | 7 | 721 (5.0) | 2667 (18.4) | 4052 (27.9) |
| 5. | Ca(NO₃)₂, 1.00 + triethanolamine, 0.02 + NaCNS, 0.05 | 4⅞ | 6¼ | 686 (4.7) | 2820 (19.4) | 4155 (28.6) |

TABLE II

| Mix No. | Admixture, Wt percent of cement on solid basis | Time of Set Relative To Plain Mix (Hrs) Initial Set | Time of Set Relative To Plain Mix (Hrs) Final Set | Compressive Strength, psi (MPa) 1-day |
|---|---|---|---|---|
| 6. | None | 5¼ | 7½ | 1079 (7.4) |
| 7. | NaNO₃, 0.25 + triethanolamine, 0.015 + NaCNS, 0.03 | 4¼ | 6 | 1435 (9.9) |
| 8. | NaNO₃, 0.40 + triethanolamine, 0.025 + NaCNS, 0.03 | 3⅞ | 5½ | 1422 (9.8) |

It is apparent that Mix 7 would be a highly cost-effective admixture by virtue of significant benefits at low total dosage, in this case less than 0.3% of cement. This is better appreciated in light of the fact that the best known inorganic accelerator, namely, calcium chloride, commonly is used at the dosage of 2.0% by weight of the cement. However, unexpectedly, it is possible to go still further in low-dosage effectiveness, as long as the three components are used in combination, as illustrated by data in Table III. The tests were made under the same conditions and with the same cement as was used to secure the foregoing data. Here and in all subsequent tables, values relative to corresponding values for a within-group plain mix, rather than absolute values, are shown. The time of set relative values are preceeded by a plus (+) or minus (−) sign. The minus sign indicates earlier setting than the plain mix, or acceleration. A plus sign indicates a delayed time of set relative to the plain mix, or a retardation.

TABLE III

| Mix No. | Admixture, Wt percent of cement on solid basis | Time of Set Relative To Plain Mix (Hrs) Initial Set | Time of Set Relative To Plain Mix (Hrs) Final Set | Compressive Strength, % of Within-group plain mix 1-day | Compressive Strength, % of Within-group plain mix 3-days |
|---|---|---|---|---|---|
| 9. | NaNO₃, 0.10 + NaCNS, 0.05 + triethanolamine, 0.015 | −1 | −1½ | 138 | 127 |
| 10. | NaNO₃, 0.10 + NaCNS, 0.03 + triethanolamine, 0.005 | −⅞ | −1¼ | 131 | 119 |

In Table III, Mix 9 employs less than 0.17% total dosage and Mix 10, less than 0.14% total dosage, based on weight of cement. The magnitudes of the beneficial effects secured at these doages are remarkable and unexpected. This is a dosage range an order of magnitude lower than commonly is used with known inorganic accelerators employed alone or with triethanolamine.

In Table I data were presented to show the need of each of the three components by successive addition. The reverse process of subtraction was used to show the significant role of the thiocyanate component in tests shown in Table IV. These tests were made with the same brand of cement and same test conditions as all tests previously described.

TABLE IV

| Mix No. | Admixture, Wt percent of cement on solid basis | Time of Set Relative To Plain Mix (Hrs) Initial Set | Time of Set Relative To Plain Mix (Hrs) Final Set | Compressive Strength, % of Within-group plain mix 3-days |
|---|---|---|---|---|
| 11. | NaNO₃, 0.25 + NaCNS, 0.03 + triethanolamine, 0.015 | −1¼ | −1¾ | 149 |
| 12. | NaNO₃, 0.25 + triethanolamine, 0.015 | −1¼ | −1¼ | 122 |

The data in Table IV show that in the three component combination, the contribution of the thiocyanate is mainly to early compressive strength. The contribution of this magnitude at the low dosage of 0.03 weight percent of cement is remarkable and unexpected.

Although the composite admixture of this invention is economically most effectively used at low dosages as shown above, it remains highly beneficial to concrete when employed at high dosages, as shown by the data in Table V. These tests were made in the same manner and under the same circumstance as those previously described, except that a different brand of cement was used.

TABLE V

| Mix No. | Admixture, Wt percent of cement on solid basis | Time of Set Relative To Plain Mix (Hrs) Initial Set | Time of Set Relative To Plain Mix (Hrs) Final Set | Compressive Strength, % of Within-group plain mix 1-day |
|---|---|---|---|---|
| 13. | NaNO₃, 0.50 + triethanolamine, 0.01 + NaCNS, 0.05 | −1¼ | −1¼ | 145 |
| 14. | NaNO₃, 1.00 + triethanolamine, 0.02 + NaCNS, 0.10 | −1⅜ | −1⅞ | 160 |
| 15. | NaNO₃, 2.00 + triethanolamine, 0.04 + | −1⅞ | −2 | 174 |

TABLE V-continued

| Mix No. | Admixture, Wt percent of cement on solid basis | Initial Set (Hrs) | Final Set (Hrs) | Within-group plain mix 1-day |
|---|---|---|---|---|
| | NaCNS, 0.20 | | | |

Further tests were made in the same manner and under the same conditions as previously described. In Table VI below are shown the beneficial effects secured by using as the sole admixture DAPA (di(hydroxyethyl)-β-aminopropionic acid) and certain adducts thereof.

TABLE VI

| Mix No. | Admixture, Wt percent of cement on solid basis | Time of Set Relative To Plain Mix (Hrs) Initial Set | Time of Set Relative To Plain Mix (Hrs) Final Set | Compressive Strength, % of Within-group plain mix 1-day | 7-days | 28-days |
|---|---|---|---|---|---|---|
| 16. | DAPA, 0.05 | −⅜ | −⅜ | 109 | 110 | 105 |
| 17. | α-methyl DAPA, 0.05 | −⅝ | −⅜ | 113 | 112 | 112 |
| 18. | calcium salt of | | | | | |
| | α-methyl DAPA, 0.01 + | −¼ | −⅝ | 107 | 108 | 101 |
| | α-methyl DAPA, 0.025 + | −¼ | −¼ | 108 | 113 | 104 |
| | α-methyl DAPA, 0.050 + | −⅜ | −⅜ | 113 | 114 | 112 |
| | α-methyl DAPA, 0.100 + | −⅝ | −1 | 110 | 112 | 110 |

Data of Table VI show that the alkanolamino acid type of material may produce accelerating and strength-enhancing effects that increase with increasing dosage over a significant range. This contrasts favorably with widely-used triethanolamine, the accelerating effects of which are more severely dosage-limited. This effect may be readily seen by contrasting data of Table VI with data of Table VII, wherein the corresponding tests were made under the same conditions, including the same brand of cement.

TABLE VII

| Mix No. | Admixture, Wt percent of cement on solid basis | Time of Set Relative To Plain Mix (Hrs) Initial Set | Time of Set Relative To Plain Mix (Hrs) Final Set | Compressive Strength, % of Within-group plain mix 1-day | 7-days | 28-days |
|---|---|---|---|---|---|---|
| 19. | triethanolamine, 0.01 | −⅛ | −⅜ | 108 | 104 | 101 |
| 20. | triethanolamine, 0.025 | −¼ | −¼ | 110 | 107 | 107 |
| 21. | triethanolamine, 0.05 | −¼ | −⅝ | 109 | 107 | 107 |
| 22. | triethanolamine, 0.10 | +⅛ | −¼ | 110 | 105 | 105 |

Data in Table VIII, obtained under the same conditions, show beneficial effects of another adduct and how such adducts are additive in accelerating effect when combined with triethanolamine or an alkanolamine acid.

TABLE VIII

| Mix No. | Admixture, Wt percent of cement on solid basis | Time of Set Relative To Plain Mix (Hrs) Initial Set | Time of Set Relative To Plain Mix (Hrs) Final Set | Compressive Strength, % of Within-group plain mix 1-day | 7-days | 28-days |
|---|---|---|---|---|---|---|
| 23. | di(hydroxyethyl)-β-aminopropionitrile, 0.05 | +¼ | −⅛ | 109 | 118 | 109 |
| 24. | di(hydroxyethyl)-β-aminopropionitrile, 0.05 + triethanolamine, 0.01 | −¼ | −⅜ | 103 | 117 | 108 |
| 25. | di(hydroxyethyl)-β-aminopropionitrile 0.05 + bicine, 0.01 | −⅜ | −⅝ | 111 | 122 | 110 |

In this context it may be noted that bicine (N,N-di(hydroxyethyl)glycine) is more effective than triethanolamine, by comparing data of Mix 24 with data of Mix 25.

The manner in which components within the scope of this invention may advantageously be combined into low-dosage but very effective three-component systems is further illustrated in Table IX. In this case another alkanolamine is employed, namely tetra(hydroxyethyl)ethylenediamine (THEED), which is an example of a larger class of hydroxyethyl-substituted diamines which are effective.

TABLE IX

| Mix No. | Admixture, Wt percent of cement on solid basis | Initial Set (Hrs) | Final Set (Hrs) | Time of Set Relative To Plain Mix / Compressive Strength, % of Within-group plain mix 1-day |
|---|---|---|---|---|
| 26. | THEED, 0.025 | −⅛ | −⅜ | 110 |
| 27. | THEED, 0.025 + triethanolamine, 0.015 | −¼ | −1 | 115 |

It may be noted that the dosages of the mixes shown in Table V are a geometric progression, with the dosage of each component in each mix being just double corresponding dosages in the prior mix. While each composite admixture is highly beneficial and acceleration and early strength of the concrete increases with increasing dosage, the magnitudes of these improvements are very modest for a test series where dosage is increasing geometrically. Clearly, limiting values of the possible improvements in this context are being approached.

TABLE IX-continued

| Mix No. | Admixture, Wt percent of cement on solid basis | Time of Set Relative To Plain Mix (Hrs) Initial Set | Time of Set Relative To Plain Mix (Hrs) Final Set | Compressive Strength, % of Within-group plain mix 1-day |
|---|---|---|---|---|
| 28. | THEED, 0.025 + triethanolamine, 0.015 + NaCNS, 0.10 | −1¼ | −1⅝ | 154 |

It may be seen from data of Table IX that highly effective accelerating admixtures may be obtained by combinations at remarkably low total dosage, in this case 0.14 weight percent of cements.

Data in Table X, Part A illustrate how a three-component admixture of this invention advantageously improves the accelerating effect of a two-component subsystem; Table X, Part B, illustrates how useful three-component admixtures are still obtained when diethanolamine is substituted for triethanolamine; and Table X, Part C, show in corresponding three-component systems that sodium salts are in some respects less effective than corresponding calcium salts, but still yield useful admixtures.

TABLE X

| Mix No. | Admixture, Wt percent of cement on solid basis | Time of Set Relative To Plain Mix (Hrs) Initial Set | Time of Set Relative To Plain Mix (Hrs) Final Set | Compressive Strength, % of Within-group plain mix 1-day | Compressive Strength, % of Within-group plain mix 28-days |
|---|---|---|---|---|---|
| | | Part A | | | |
| 29. | NaNO₃, 0.50 + NaCNS, 0.05 + triethanolamine, 0.01 | −1¼ | −1½ | 145 | 112 |
| 30. | NaNO₃, 0.50 + NaCNS, 0.05 | −⅞ | −1⅜ | 137 | 111 |
| | | PART B | | | |
| 31. | NaNO₃, 0.50 + NaCNS, 0.05 + diethanolamine, 0.01 | −⅞ | −1¼ | 129 | 109 |
| | | PART C | | | |
| 32. | Ca(NO₃)₂, 2.00 + Ca(CNS)₂, 0.20 + triethanolamine, 0.04 | −1¼ | −2⅜ | 151 | 140 |
| 33. | NaNO₃, 2.00 + NaCNS, 0.20 + triethanolamine, 0.04 | −⅞ | −2 | 174 | 115 |

Tests discussed above indicate that sodium nitrate may be used in three-component admixtures of the type here considered, in lieu of calcium nitrate. It has also been shown as indicated in Table XI that a mixture of calcium and magnesium nitrates, prepared by treatment of dolomite with nitric acid, and hereinbelow designated DOLNIT may also be advantageously used. Data of Table XI also show the advantages of the three-component admixture relative to selected one- and two-component subsystems. These tests were conducted in the same manner and under the same conditions as those previously discussed.

TABLE XI

| Mix No. | Admixture, Wt percent of cement on solid basis | Time of Set Relative To Plain Mix (Hrs) Initial Set | Time of Set Relative To Plain Mix (Hrs) Final Set | Compressive Strength, % of Within-group plain mix 1-day | Compressive Strength, % of Within-group plain mix 7-days | Compressive Strength, % of Within-group plain mix 28-days |
|---|---|---|---|---|---|---|
| 34. | NaCNS, 0.20 | −1⅝ | −2 | 114 | 121 | 92 |
| 35. | DOLNIT, 2.00 | −1¼ | −1¾ | 90 | 108 | 95 |
| 36. | NaCNS, 0.20 + DOLNIT, 2.00 | −1⅝ | −2¼ | 123 | 122 | 101 |
| 37. | NaCNS, 0.20 + DOLNIT, 2.00 + triethanolamine, 0.04 | −1¾ | −2¼ | 130 | 131 | 104 |

Similar data, using calcium nitrate, and bicine in lieu of triethanolamine, and obtained under similar conditions, are shown in Table XII.

TABLE XII

| Mix No. | Admixture, Wt percent of cement on solid basis | Time of Set Relative To Plain Mix (Hrs) Initial Set | Time of Set Relative To Plain Mix (Hrs) Final Set | Compressive Strength, % of Within-group plain mix 1-day | Compressive Strength, % of Within-group plain mix 3-days | Compressive Strength, % of Within-group plain mix 7-days |
|---|---|---|---|---|---|---|
| 38. | Ca(NO₃)₂, 0.50 | −¼ | −⅞ | 101 | 108 | 104 |
| 39. | Ca(NO₃)₂, 0.50 + bicine, 0.01 | −1½ | −2¼ | 117 | 115 | 112 |
| 40. | Ca(NO₃)₂, 0.50 + bicine, 0.01 + NaCNS, 0.05 | −1¾ | −2¼ | 142 | 123 | 115 |

Data of Table XIII illustrates the kinds of benefits secured when sodium thiosulfate, Na₂S₂O₃, is employed as such, or together with NaCNS in admixture systems of the type here considered. Test conditions were the same as before.

TABLE XIII

| Mix No. | Admixture, Wt percent of cement on solid basis | Time of Set Relative To Plain Mix (Hrs) Initial Set | Time of Set Relative To Plain Mix (Hrs) Final Set | Compressive Strength, % of Within-group plain mix 1-day | Compressive Strength, % of Within-group plain mix 7-days | Compressive Strength, % of Within-group plain mix 28-days |
|---|---|---|---|---|---|---|
| 41. | NaNO$_3$, 0.15 + triethanolamine, 0.01 + Na$_2$S$_2$O$_3$, 0.15 | −¾ | −¾ | 115 | 102 | 102 |
| 42. | NaNO$_3$, 0.15 + triethanolamine, 0.01 + Na$_2$S$_2$O$_3$, 0.15 + NaCNS, 0.025 | −¾ | −1¼ | 131 | 119 | 111 |

Supplemental tests under the same conditions but with higher dosages of nitrate and thiosulfate salts gave results as shown in Table XIV. These data indicate that the alkanolamino acid, bicine, may be substituted for triethanolamine in these systems, with no sacrifice to acceleration of time of set of the concretes.

TABLE XIV

| Mix No. | Admixture, Wt percent of cement on solid basis | Time of Set Relative To Plain Mix (Hrs) Initial Set | Time of Set Relative To Plain Mix (Hrs) Final Set | Compressive Strength, % of Within-group plain mix 1-day | Compressive Strength, % of Within-group plain mix 7-days | Compressive Strength, % of Within-group plain mix 28-days |
|---|---|---|---|---|---|---|
| 43. | Ca(NO$_3$)$_2$, 0.25 + Na$_2$S$_2$O$_3$, 0.25 | −¾ | −¾ | 107 | 107 | 103 |
| 44. | Ca(NO$_3$)$_2$, 0.25 + Na$_2$S$_2$O$_3$, 0.25 + triethanolamine, 0.01 | −1¼ | −1⅜ | 112 | 112 | 108 |
| 45. | Ca(NO$_3$)$_2$, 0.25 + Na$_2$S$_2$O$_3$, 0.25 + bicine, 0.01 | −1¼ | −1 2/8 | 107 | 110 | 102 |

It is within the scope of the invention to incorporate in the cement mixes as herein provided other admixtures known in the art for the express purpose for which they are normally employed. It is also within the scope of the invention to employ the accelerating system herein provided with known set retarders, such as lignosulfonates, sucrose, glucosaccharides and the like, to secure the benefits of these materials but with less retardation. Further with regard to admixtures known in the art the American Concrete Institute Committee 201 on chloride corrosion resistance has recommended (Concrete Construction, Vol. 27, p. 777, 1982) that the maximum level of water soluble chloride ion (Cl$^-$) to be used for pre-stressed concrete applications, an application which places the most stringent requirements for corrosion prevention, be 0.06%. It has been found that thiocyanate replaced by chloride at 0.05% provides comparable performance when added to a fixed level of nitrate salt and alkanolamine, as illustrated by data in Table XV, wherein the data were obtained at room temperature and under the conditions previously described.

TABLE XV

| Mix No. | Admixture, Wt percent of cement on solid basis | Time of Set Relative To Plain Mix (Hrs) Initial Set | Time of Set Relative To Plain Mix (Hrs) Final Set | Compressive Strength, % of Within-group plain mix 1-day | Compressive Strength, % of Within-group plain mix 7-days | Compressive Strength, % of Within-group plain mix 28-days |
|---|---|---|---|---|---|---|
| 46. | Ca(NO$_3$)$_2$, 0.25 + triethanolamine, 0.01 | −1 | −1/28 | 106 | 108 | 107 |
| 47. | Ca(NO$_3$)$_2$, 0.25 + triethanolamine, 0.01 + CaCl$_2$, 0.05 | −1⅜ | −1 6/8 | 117 | 121 | 110 |
| 48. | Ca(NO$_3$)$_2$, 0.25 + triethanolamine, 0.01 + NaCNS, 0.05 | −1⅜ | −2 | 117 | 117 | 108 |

Data in Table XV, comparing Mix 47 to Mix 48, show that in this context and at these low dosages, the CaCl$_2$ is approximately as effective as the thiocyanate, in terms of promoting acceleration of setting and enhancement of compressive strength.

In complex admixture systems containing nitrates, thiocyanates triethanolamine and other amines, it has been found that increasing the amount and proportion of triethanolamine within the dosage range in which it normally accelerates, surprisingly, decreases the acceleration of the composite admixture as shown in data of XVII below. All test conditions were the same as previously described. The effect is shown in systems containing tetra(hydroxyethyl)ethylenediamine (THEED) and an analog thereof, namely, triethoxylated ethylenediamine.

TABLE XVI

| Mix No. | Admixture, Wt percent of cement on solid basis | Time of Set Relative To Plain Mix (Hrs) Initial Set | Time of Set Relative To Plain Mix (Hrs) Final Set | Compressive Strength, % of Within-group plain mix 1-day |
|---|---|---|---|---|
| 49. | NaNO$_3$, 0.25 + NaCNS, 0.025 + THEED, 0.038 + triethanolamine, 0.005 | −1¼ | −1¼ | 113 |
| 50. | NaNO$_3$, 0.25 + | −1¼ | −1¼ | 117 |

TABLE XVI-continued

| Mix No. | Admixture, Wt percent of cement on solid basis | Time of Set Relative To Plain Mix (Hrs) Initial Set | Time of Set Relative To Plain Mix (Hrs) Final Set | Compressive Strength, % of Within-group plain mix 1-day |
|---|---|---|---|---|
| | NaCNS, 0.025 + THEED, 0.038 + triethanolamine, 0.01 | | | |
| 51. | NaNO₃, 0.15 + NaCNS, 0.042 + triethoxylated ethylene diamine, 0.025 + triethanolamine, 0.006 | −1¼ | −1¼ | 115 |
| 52. | NaNO₃, 0.15 + NaCNS, 0.042 + triethoxylated ethylene diamine, 0.025 + triethanolamine, 0.010 | −⅞ | −1¼ | 124 |

Further data pertaining to systems containing a nitrate and a thiocyanate with and without an alkanolamine or alkanolamino acid, obtained under the same test conditions as previously described, except that a cement content of 517 pounds per cubic yard (307 kg/m³) was used, are shown in Table XVII below.

TABLE XVII

| Mix No. | Admixture, Wt percent of cement on solid basis | Time of Set Relative To Plain Mix (Hrs) Initial Set | Time of Set Relative To Plain Mix (Hrs) Final Set | Compressive Strength % of Within-group plain mix 1-day | Compressive Strength % of Within-group plain mix 3-days |
|---|---|---|---|---|---|
| 53. | Ca(NO₃)₂, 0.50 + NaCNS, 0.10 | −1¼ | −1⅞ | 110 | 122 |
| 54. | Ca(NO₃)₂, 0.50 + NaCNS, 0.10 + triethanolamine, 0.01 | −1 4/8 | −1 4/8 | 119 | 119 |
| 55. | Ca(NO₃)₂, 0.50 + NaCNS, 0.10 + di(hydroxyethyl)-β-aminopropionic acid, 0.02 | −1 6/8 | −1¼ | 121 | 126 |
| 56. | Ca(NO₃)₂, 0.50 + NaCNS, 0.10 + bicine, 0.01 | −1 4/8 | −1 6/8 | 123 | 126 |
| 57. | Ca(NO₃)₂, 0.50 + NaCNS, 0.10 + N—hydroxyethylisopropanolamine, 0.01 | −1⅜ | −1⅜ | 107 | 116 |
| 58. | Ca(NO₃)₂, 0.50 + NaCNS, 0.10 + diethoxylated hydrazine, 0.02 | −1⅜ | −1⅜ | 103 | 110 |
| 59. | Ca(NO₃)₂, 0.50 + NaCNS, 0.10 + diisopropanolamine, 0.01 | −1 2/8 | −1 4/8 | 112 | 116 |
| 60. | Ca(NO₃)₂, 0.50 + NaCNS, 0.10 + N—hydroxyethyldiisopropanolamine, 0.01 | −1¼ | −1⅜ | 106 | 124 |

Data in Table XVII illustrate how a variety of materials within the scope of this invention may advantageously be added at very small dosages to a fixed base of nitrate plus thiocyanate to secure increased acceleration of setting times. Some of the additions are beneficial to compressive strength of the concretes and some are not. However, the compressive strength levels are acceptable in all cases.

Data in Table XIII below were secured under the same test conditions, including the same brand of cement and the same cement content, except that the tests were conducted at 50° F. (10° C.). The same base mixture of nitrate and thiocyanate was employed, as shown.

TABLE XIII

| Mix No. | Admixture, Wt percent of cement on solid basis | Time of Set Relative To Plain Mix (Hrs) Initial Set | Time of Set Relative To Plain Mix (Hrs) Final Set | Compressive Strength, % of Within-group plain mix 1-day |
|---|---|---|---|---|
| 61. | Ca(NO₃)₂, 0.50 + NaCNS, 0.10 | −2⅞ | −3 | 130 |
| 62. | Ca(NO₃)₂, 0.50 + NaCNS, 0.10 + triethanolamine, 0.01 | −3⅜ | −4¼ | 161 |
| 63. | Ca(NO₃)₂, 0.50 + NaCNS, 0.10 + di(hydroxyethyl)-β-aminopropionic acid, 0.02 | −3⅜ | −4 | 153 |
| 64. | Ca(NO₃)₂, 0.50 + NaCNS, 0.10 + bicine, 0.01 | −3⅜ | −4 2/8 | 157 |
| 65. | Ca(NO₃)₂, 0.50 + NaCNS, 0.10 + diethoxylated hydrazine, 0.02 | −2⅜ | −2 2/8 | 136 |
| 66. | Ca(NO₃)₂, 0.50 + NaCNS, 0.10 + N—hydroxyethyldiisopropanolamine, 0.01 | −2⅜ | −2 2/8 | 137 |

Data in Table XIII show very significant accelerations may be obtained at low temperatures by these admixture combinations, with the alkanolamino acids being more nearly comparable to triethanolamine in this context. Effects of the alkanolamino acid, bicine, employed alone are significantly beneficial as shown in Table XIX wherein test conditions were the same as before:

TABLE XIX

| Mix No. | Admixture, Wt percent of cement on solid basis | Time of Set Relative To Plain Mix (Hrs) Initial Set | Time of Set Relative To Plain Mix (Hrs) Final Set | Compressive Strength, % of Within-group plain mix 1-day | Compressive Strength, % of Within-group plain mix 7-days | Compressive Strength, % of Within-group plain mix 28-days |
|---|---|---|---|---|---|---|
| 67. | bicine, 0.01 | | −⅞ | 116 | 112 | 108 |
| 68. | bicine, 0.025 | | −⅝ | 108 | 111 | 107 |
| 69. | bicine, 0.05 | | 0 | 113 | 111 | 106 |
| 70. | bicine, 0.10 | | −1⅜ | 107 | 115 | 109 |

Corresponding data for the alkanolamino acid, N,N-di(hydroxyethyl)aminomethyl succinic acid, monosodium salt, (DAMSA) obtained under the same conditions, and employed alone, are shown in Table XXI.

TABLE XX

| Mix No. | Admixture, Wt percent of cement on solid basis | Time of Set Relative To Plain Mix (Hrs) | | Compressive Strength, % of Within-group plain mix | | |
|---|---|---|---|---|---|---|
| | | Initial Set | Final Set | 1-day | 7-days | 28-days |
| 71. | DAMSA, 0.01 | | −⅛ | 112 | 106 | 112 |
| 72. | DAMSA, 0.025 | | −⅛ | 125 | 111 | 117 |
| 73. | DAMSA, 0.05 | | −⅛ | 122 | 108 | 124 |
| 74. | DAMSA, 0.10 | | −4/8 | 131 | 122 | 125 |

While the invention has been described with reference to certain preferred embodiments thereof, those skilled in the art will appreciate that certain modifications and substitutions can be made without departing from the spirit of the invention. It is intended, therefore, that the invention be limited only by the scope of the claims which follow.

What is claimed is:

1. A hydraulic cement mix comprising hydraulic cement, aggregate, sufficient water to effect hydraulic setting of the cement, and an admixture comprising a composition or a mixture of compositions selected from the group consisting of alkali, ammonium and alkaline earth salts of thiocyanic acid, and water soluble thiosulfates; a composition or a mixture of compositions selected from the group comprising alkanolamine; and related water soluble alkanolamines and alkanolamino acids; and a composition or a mixture of compositions selected from the group comprising alkali and alkaline earth salts of nitric acid; said additive being present in an amount sufficient to accelerate the rate of hardening of said hydraulic cement mix and to increase its compressive strength after hardening.

2. A hydraulic cement mix in accordance with claim 1 wherein said hydraulic cement comprises portland cement.

3. A hydraulic cement mix in accordance with claim 1 wherein said salts of thiocyanic acid are sodium, potassium, ammonium and calcium thiocyanate; said soluble thiosulfates are sodium, potassium, ammonium, calcium and magnesium thiosulfates; said alkanolamines are diethanolamine and triethanolamine; said alkanolamino acids are bicine and di(hydroxyethyl)-β-propionic acid; a said related soluble alkanolamine is tetra(hydroxyethyl)ethylenediamine; and said salts of nitric acid are sodium, potassium, calcium, magnesium and ammonium nitrates.

4. A hydraulic cement mix in accordance with claim 1 wherein said salt of thiocyanic acid is present in an amount from about 0.01% to about 2.50% based on the weight of the cement; said alkanolamine is present in an amount from 0.005% to about 0.08% based on the weight of the cement; said salt of nitric acid is present in an amount from about 0.05% to about 2.00% based on the weight of the cement; said alkanolamino acid is present from about 0.005% to 0.10% based on weight of cement; and said thiosulfate salt is present in an amount from about 0.05% to about 2.00% based on weight of cement.

5. A hydraulic cement mix in accordance with claim 1 wherein said salt of thiocyanic acid is present in an amount from about 0.025% to about 0.50%; said alkanolamine from about 0.005% to about 0.02%; and said salt of nitric acid from about 0.10% to about 1.00%, based on the weight of the cement.

6. A hydraulic cement mix in accordance with claim 1 wherein said salt of thiocyanic acid is sodium thiocyanate.

7. A hydraulic cement mix in accordance with claim 1 wherein said salt of nitric acid is sodium nitrate.

8. A hydraulic cement mix in accordance with claim 1 wherein said salt of nitric acid is calcium nitrate.

9. A hydraulic cement mix in accordance with claim 1 wherein said salt of nitric acid is a mixture of sodium nitrate and calcium nitrate.

10. A hydraulic cement mix in accordance with claim 1 wherein said salt of nitric acid is a mixture of magnesium nitrate and calcium nitrate.

11. A hydraulic cement mix in accordance with claim 1 wherein said alkanolamine is triethanolamine.

12. A hydraulic cement mix in accordance with claim 1 wherein said alkanolamine is diethanolamine.

13. A hydraulic cement mix in accordance with claim 1 wherein said thiosulfate salt is sodium thiosulfate.

14. A hydraulic cement mix in accordance with claim 1 wherein said thiosulfate salt is calcium thiosulfate.

15. A hydraulic cement mix in accordance with claim 1 wherein said water soluble alkanolamino acid is bicine.

16. A hydraulic mix in accordance with claim 1 wherein said water soluble alkanolamino acid is di(hydroxyethyl)-β-aminopropionic acid.

17. A hydraulic mix in accordance with claim 1 wherein said water soluble alkanolamino acid is di(hydroxyethyl)-β-amino-α-methylpropionic acid.

18. A hydraulic mix in accordance with claim 1 wherein said alkanolamino acid is N,N-di(hydroxyethyl)aminomethyl succinic acid.

19. A hydraulic cement mix in accordance with claim 1 wherein said water soluble alkanolamine is tetra(hydroxyethyl)ethylenediamine.

20. A process for accelerating the hardening of hydraulic cement mixes which includes sequentially adding hydraulic cement, aggregate in an amount up to 80% by weight based on total weight of said cement mix, and sufficient water to effect hydraulic setting of the cement, comprising incorporating an admixture comprising mixtures of
  (a) a composition selected from the group comprising ammonium, alkali, and alkaline earth salts of thiocyanic acid, and mixtures thereof; and water soluble thiosulfates that may be substituted in whole or in part for the thiocyanates; and
  (b) an alkanolamine; and water soluble alkanolamino acids, substituted in whole or part for the alkanolamine;
  (c) a composition selected from the group comprising ammonium, alkali, and alkaline earth salts of nitric acid, and mixtures thereof;

said additive being incorporated in an amount sufficient to accelerate the rate of hardening of said hydraulic cement mix and to increase its compressive strength after hardening.

21. A process in accordance with claim 20, wherein said hydraulic cement comprises portland cement.

22. A process in accordance with claim 20, wherein the thiocyanate is present in an amount from about 0.01% to about 0.50%; the alkanolamine is present in an amount from about 0.005% to about 0.08%; and the nitrate is present in an amount from about 0.05% to about 2.00% based on the weight of the cement in the mix; said soluble alkanolamino acid is present from about 0.005 to 0.10% based on weight of cement; and said thiosulfate salt is present in an amount from about 0.05% to about 2.00% based on weight of cement.

23. A process in accordance with claim 20 wherein the thiocyanate is sodium thiocyanate.

24. A process in accordance with claim 20 wherein the alkanolamine is triethanolamine.

25. A process in accordance with claim 20 wherein the nitrate is sodium nitrate.

26. A process in accordance with claim 20 wherein the nitrate is calcium nitrate.

27. A process in accordance with claim 17 wherein the nitrate is a mixture of sodium nitrate and calcium nitrate.

28. A process in accordance with claim 17 wherein the nitrate is a mixture of magnesium nitrate and calcium nitrate.

29. A process in accordance with claim 17 wherein said thiosulfate salt is sodium thiosulfate.

30. A process in accordance with claim 17 wherein said thiosulfate salt is calcium thiosulfate.

31. A process in accordance with claim 17 wherein said water soluble of alkanolamino acid is bicine.

32. A process in accordance with claim 17 wherein said water soluble alkanolamino acid is di(hydroxyethyl)-$\beta$-aminopropionic acid.

33. A process in accordance with claim 17 wherein said water soluble alkanolamine is tetra(hydroxyethyl)ethylenediamine.

* * * * *